Sept. 15, 1936.  A. E. HICKEL  2,054,419
JOURNAL LUBRICATION
Filed April 28, 1936
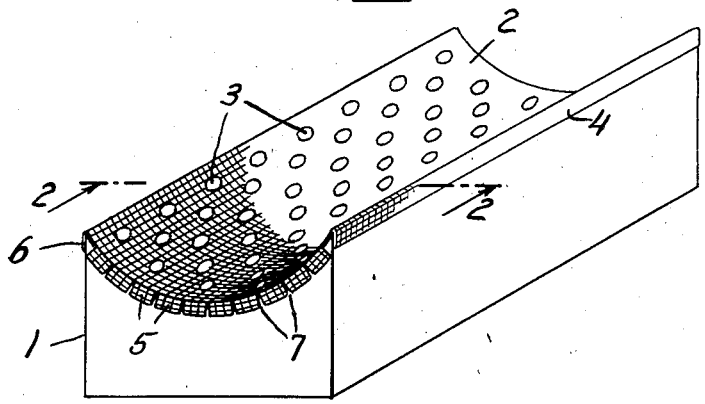
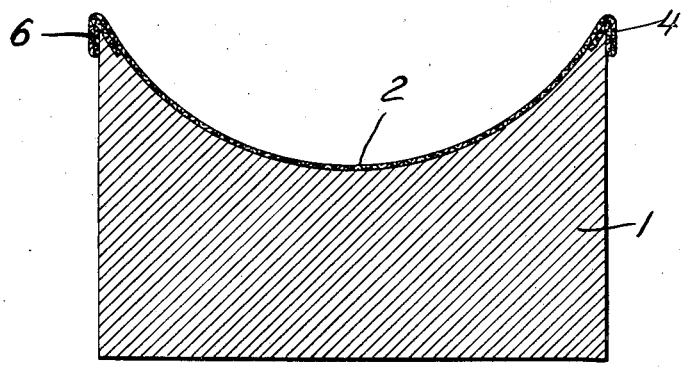
INVENTOR
Albert E. Hickel
BY
Pennie, Davis, Marvin + Edmonds
ATTORNEYS Patented Sept. 15, 1936

2,054,419

UNITED STATES PATENT OFFICE 2,054,419

JOURNAL LUBRICATION

Albert Edward Hickel, East Chicago, Ind., assignor to Sinclair Refining Company, New York, N. Y., a corporation of Maine Application April 28, 1936, Serial No. 76,725

15 Claims. (Cl. 308—83)

This invention relates to the lubrication of bearing surfaces and more particularly to the lubrication of bearings normally lubricated or adapted to be lubricated by cakes or blocks of solid lubricant such as hard grease. An example of bearing of this type is the conventional driving journal of locomotives.

With journals such as the conventional driving journal of locomotives, the load is carried on the upper surface of the journal and the lubricant is applied to the lower surface. As the journal revolves it wipes the grease lubricant and carries a portion of it in between the bearing surfaces. A journal of this general type is illustrated in United States Letters Patent Nos. 713,410 and 763,599, granted to A. G. Elvin in 1902 and 1904, respectively. One method of and means for applying a grease lubricant, as well as the shape of the conventional grease cake, is also illustrated by the said Letters Patent.

Though my invention is not limited to bearings of locomotives, or of any other specific machine, it is believed that a description thereof as applied to the lubrication of the conventional driving journal bearings of locomotives will serve to illustrate its principles and applications.

A locomotive driving journal assembly is normally equipped with a grease cellar located below the journal and adapted to hold a relatively large cake of hard grease lubricant. This grease cake is formed before being applied to the journal and is so shaped that its upper surface is concave, in conformity with the curvature of the journal, as shown in the drawings of the Elvin patents, previously referred to.

This grease cake fits into the grease cellar of the journal assembly and rests upon a flat horizontally arranged steel plate, known as the "follower plate". The upper concave surface of the grease cake is normally covered by a rigid, perforated steel plate, known as the "cover plate", this plate being likewise shaped to conform, more or less perfectly, with the curvature of the journal.

This "follower plate" with the grease cake resting thereon, is pushed upwardly by a spring or springs and thus the perforated steel "cover plate", with the grease just beneath it and in immediate contact with it, is flexibly held against the underside of the revolving journal. Frictional heat causes the temperature of the cover plate to rise which, in turn, causes a softening of the upper surface of the grease cake. The softened grease, by reason of the pressure exerted by the follower plate, feeds through the perforations of the steel cover plate onto the journal surface. In this way the rate at which the grease lubricant feeds to the journal is roughly proportional to the bearing temperature. As the grease feeds to the journal and better lubrication is obtained the bearing temperature tends to drop and the rate at which the lubricant is fed to the journal accordingly diminishes.

Though the method of lubricating locomotive driving journals, as outlined above, has been in general use for years, it is subject to several serious objections. One of the difficulties is that of maintaining the perforated steel cover plate in proper condition. These plates are not a permanent part of the journal assembly but must be frequently replaced. This replacement is a very substantial item of cost. Not only do these plates wear out but they are frequently damaged in service or in the process of replenishing the supply of grease.

In normal operation the grease cake remains in the grease cellar until it has been consumed to such an extent that a new supply of grease is required, at which time the cellar is opened, the remainder of the grease cake, together with the attached perforated steel cover plate, is removed and a new cake of grease, having attached to it a new or a reconditioned cover plate, is inserted. The remaining grease is then stripped from the old plate, and, if the old plate is not too badly worn or warped out of shape, it may be reconditioned and reused. The reconditioning of these cover plates is a substantial item of cost as it is essential that they be reshaped to accurately conform with the journal curvature. This re-forming operation is tedious and expensive. Unless the old plate can be restored to practically perfect condition, it must be discarded, for the use of ill-formed plates frequently results in serious lubrication difficulties. If there is a "high spot" in the plate, for instance, excessive frictional heat will be developed at that point, the grease thereby excessively softened and uneven feeding, excessive grease consumption, and frequently bearing failure, will result. Excessive localized heating likewise causes a further deformation of the plate and thus further aggravates such conditions.

Various substitutes for the perforated steel cover plate have been suggested in the past but for one reason or another none of those substitutes were found worthy of adoption. For instance, it has been suggested that a covering of ordinary wire cloth, such as that used for domestic window screening, be substituted for the steel plate. One of the difficulties with the use of such wire cloth is the excessive and uncontrollable rate of feed of the grease to the journal.

It is a purpose of my invention to avoid the lubrication difficulties coincident to the use of the customary steel cover plate and to obtain more economical lubrication by eliminating the cost of maintenance and replacement of these steel cover plates.

According to my invention, I use, instead of the customary steel plate, a flexible wire cloth impregnated with a film-forming material so as to close the normal interstices of the wire cloth and suitably perforated to permit the feed of the grease to the journal at the desired rate. I have found that such impregnated wire cloth possesses many advantages over the customary steel plate; being flexible it readily conforms to the curvature of the journal without danger of "high spots" or local overheating so that the lubricant is uniformly supplied. The cost of the impregnated wire cloth is negligible compared to the cost of the perforated steel plates and may be discarded when the old grease cake is removed from the cellar.

By my invention, it is made practical to form the grease lubricant into cakes and to attach the wire cloth covering at the place of manufacture of the grease so that the grease cake, when received by the consumer, is ready for immediate application to the bearings to be lubricated. This avoids the present necessity of providing forming machines and presses at the various points of application. Other advantages will be apparent from the further description of this invention.

My invention will be further described with reference to the accompanying drawing, though it is to be understood that my invention is not limited to the details there shown nor to the particular application represented by the drawing.

Fig. 1 represents, in perspective, a cake of lubricating grease, such as is commonly used in the lubrication of the bearings of locomotive driving journals, with my perforated impregnated wire cloth covering attached.

Fig. 2 represents a cross-sectional view of the grease cake along the line 2—2 of Fig. 1.

In the drawing the numeral 1 represents a grease cake of generally rectangular shape but having its upper surface concave to conform to the curvature of the journal to be lubricated. My impregnated wire cloth cover screen 2, perforated as indicated at 3, is fitted over the upper concave surface of the grease cake. The edges of the cover screen are preferably folded back along the sides and ends of the grease cake as shown at 4 and 5, respectively, so as to hold the screen in place and to protect the edges of the grease cake. It has in some instances been found desirable to fold the screen under along the sides an inch or two so that there is a double thickness of the screen, as indicated at 6 of Fig. 2, thus somewhat increasing the rigidity of the screen along its outer edges. To permit the folding down of the ends of the screen along the curved surface of the grease cake, these ends may be snipped as shown at 7.

I have found it generally preferable to shape my screen after it has been perforated. By following this procedure a number of the screens may be perforated by a single operation of a punch press. After the screen has been formed it may be fitted on to the previously formed grease cake and the cake is then ready for shipment or for insertion in the grease cellar of the journal.

The wire cloth may be of any ordinary metal sufficiently soft and flexible to be readily punched and shaped such as galvanized steel, copper, brass or rust-proof alloys. I have found 14 mesh galvanized steel wire cloth made from 0.013 inch diameter wire and also that made from 0.011 inch diameter wire to give excellent results; however, the mesh and diameter of the wire may be varied within reasonable limits.

The precise nature of the film-forming material, with which the wire is impregnated, is not of particular importance so long as it is capable of resisting the temperatures encountered in the bearings, is sufficiently flexible after drying to permit bending and folding of the wire cloth without fracture and permits punching without cracking and leaving ragged edges. Film-forming materials such as the lacquer-like substances consisting primarily of cellulose derivatives have been found to give excellent results.

Impregnated wire cloth suitable for the purpose of my invention is available in the market under numerous trade names and is extensively used in connection with the housing of poultry and the like as a substitute for glass where the transmission of ultra-violet light is desirable. For the purpose of this invention the light-transmitting properties of the film are of no apparent consequence; however, I have obtained excellent results from the use of these readily available impregnated wire cloths or screens.

The optimum size, number and location of perforations in the impregnated wire cloth of my invention will vary somewhat with the characteristics of the grease lubricant and the nature of the bearing to which it is to be applied. Generally I prefer to use perforations about $\frac{3}{16}$ of an inch in diameter, more or less evenly distributed, and in such numbers that their total area constitutes from approximately ¼ to approximately ⅕ of the total area of the screen. I have found that when using a grease of the fibre type it is generally desirable to use slightly larger perforations than when using a cold set grease.

In the practice of my invention I have observed no burning or charring of the grease, such as is frequently encountered when the customary steel cover plate is not in perfect condition. I have observed in the practice of my invention that the frictional heat developed by the bearing is considerably less than it is when the customary steel plate is used, this being reflected by a lower normal operating temperature of the crown brasses of the bearing.

I prefer to use a wire cloth so impregnated with a film-forming material that the thickness of the film closing the normal interstices of the wire cloth is less than the thickness of said wire cloth. By so doing, the surface of the impregnated wire cloth is composed of numerous indentations coinciding with the normal interstices of the wire cloth. The grease fed to the bearing becomes entrapped in these indentations on the bearing side of the wire cloth. This forms a large area of lubricant in direct contact with the journal surface and as the journal revolves its surface is constantly being wiped by this large area of entrapped lubricant. In this way a heavier and more uniform grease film is maintained at the interface of the journal. In spite of the maintenance of this heavier grease film, the grease consumption is materially reduced by my invention. This is probably due in part to the lower journal temperature and in part to the numerous indentations in the surface of the wire cloth which holds the softened grease in contact with the journal and prevents its being squeezed out and lost on the road-bed.

I have further observed that journals lubricated in accordance with my invention are capable of operating at higher speeds and carrying heavier loads than the same journal lubricated by the same grease lubricant when the customary perforated steel plate is used. Whereas the upper surface of the perforated steel plate is frequently bright and shiny, having on it, at best, a very thin lubricating film, the upper surface of the screen of my invention is constantly covered with a creamy or oily layer of lubricant.

As a further illustration of the advantages to be derived from the substitution of my impregnated wire cloth screen for the conventional perforated steel plate, I have conducted comparative tests using identical grease lubricants. These tests were run on a stationary machine of the type commonly used for testing locomotive driving journal lubricants and the like, the test machine being equipped with suitable instruments for accurately measuring the load on the bearing, the speed of rotation of the journal, the power input to the machine, the amount of grease lost and consumed during the test, the rise in temperature of the bearing due to friction and the like. The condition of load and speed were, in each case, identical and approximated conditions encountered in service. These tests were extended over a period of five days each.

During these tests, when the steel-covered plate was used, I observed an average frictional temperature rise in the bearing of 154° F. and an average power input of 156 watts, the total grease consumed and wasted out of the bearing being 5½ ounces. When my impregnated wire cloth covering was used, I observed an average frictional temperature rise in the bearing of only 142.5° F., and an average power input of 146 watts, the grease consumed and wasted out of the bearing being only 3⅛ ounces. The frictional temperature noted above is the difference between atmospheric temperature and the recorded bearing temperature.

During these tests the maximum temperature of the bearing encountered was between 250 to 290° F. Where the perforated steel plate was used, the bearing temperature rose to approximately 260° F. or higher during each of the five days of the test. During the tests, using the impregnated wire cloth covering of my invention, the bearing temperature did not rise above 220° F. after the second or third day of the test.

The results of these tests indicate that by substituting the impregnated wire cloth covering of my invention, sometimes referred to herein as a screen, better lubrication of the bearing, and more favorable operating conditions, are obtained, thereby prolonging the life of the bearing and reducing the amount of energy lost through friction. Further, the rate at which the grease is used or lost is substantially reduced, resulting in a saving not only of lubricant but also in the expense and inconvenience of repacking the journals.

I claim:

1. A cake of solid journal lubricant having a concave surface conforming generally to the curvature of the journal to be lubricated, said concave surface having a covering of wire cloth impregnated with a film-forming material so that the normal interstices of the wire cloth are closed, and so perforated as to permit the passage of a regulated amount of the lubricant through the said perforations to the journal surface, the said covering conforming to the concave surface of the lubricant cake and being in immediate contact therewith.

2. The product defined by claim 1 in which the wire cloth is woven from galvanized steel wire of approximately 0.011 to 0.013 inch diameter.

3. The product defined by claim 1 in which the wire cloth is woven of galvanized steel wire of approximately 0.011 to 0.013 inch diameter and is of a fineness of about 14 mesh per inch.

4. The product defined by claim 1 in which the impregnated wire cloth is sufficiently flexible to withstand bending and folding without fracture and to readily conform to the curvature of the journal.

5. The product defined by claim 1 in which the wire cloth is impregnated with a lacquer-like film-forming material comprising a cellulose derivative capable of withstanding high temperatures.

6. The product defined by claim 1 in which the aggregate area of the perforations is approximately 20 to 25 percent of the total area of the concave surface of the grease cake.

7. The product defined by claim 1 in which the film closing the normal interstices of the wire cloth is of less thickness than the wire cloth so that the outer surface of the latter is composed of numerous indentations coinciding with the original interstices of the wire cloth.

8. A journal lubricant cake covering comprising wire cloth impregnated with a film-forming material so that the normal interstices of the wire cloth are closed and so perforated as to permit the passage of a regulated amount of the lubricant through the said perforations to the journal surface.

9. The product defined by claim 8 in which the impregnated wire cloth is sufficiently flexible to readily conform to the curvature of the surface to be lubricated.

10. The product defined by claim 8 in which the wire cloth is woven from galvanized steel wire of approximately 0.011 to 0.013 inch diameter.

11. The product defined by claim 8 in which the wire cloth is woven of galvanized steel wire of approximately 0.011 to 0.013 inch diameter and is of a fineness of about 14 mesh per inch.

12. The product defined by claim 8 in which the impregnated wire cloth is sufficiently flexible to withstand bending and folding without fracture and to readily conform to the curvature of the journal.

13. The product defined by claim 8 in which the wire cloth is impregnated with a lacquer-like film-forming material comprising a cellulose derivative capable of withstanding high temperatures.

14. The product defined by claim 8 in which the aggregate area of the perforations is approximately 20 to 25 percent of the total area of the concave surface of the grease cake.

15. The product defined by claim 8 in which the film closing the normal interstices of the wire cloth is of less thickness than the wire cloth so that the outer surface of the latter is composed of numerous indentations coinciding with the original interstices of the wire cloth.

ALBERT EDWARD HICKEL.